J. V. ROBINSON.
AUTOMATIC TRAIN PIPE CONNECTOR.
APPLICATION FILED MAR. 14, 1914.
1,245,791.  Patented Nov. 6, 1917.
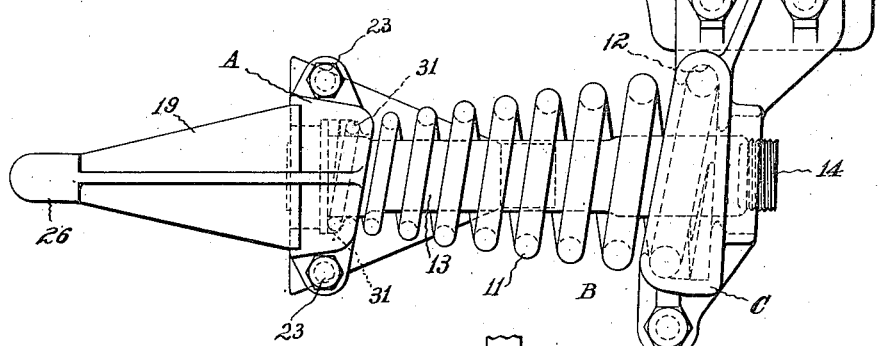
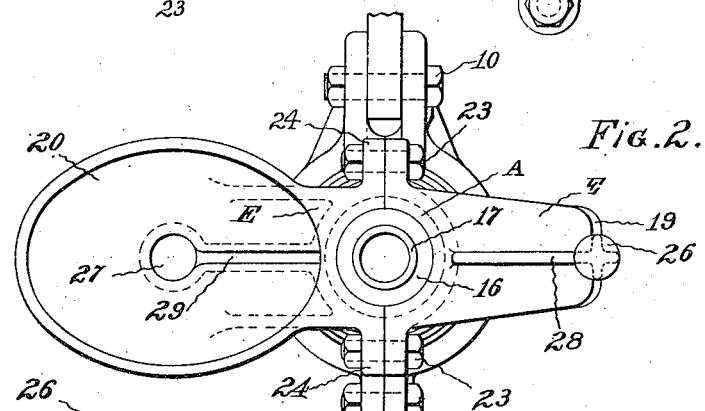
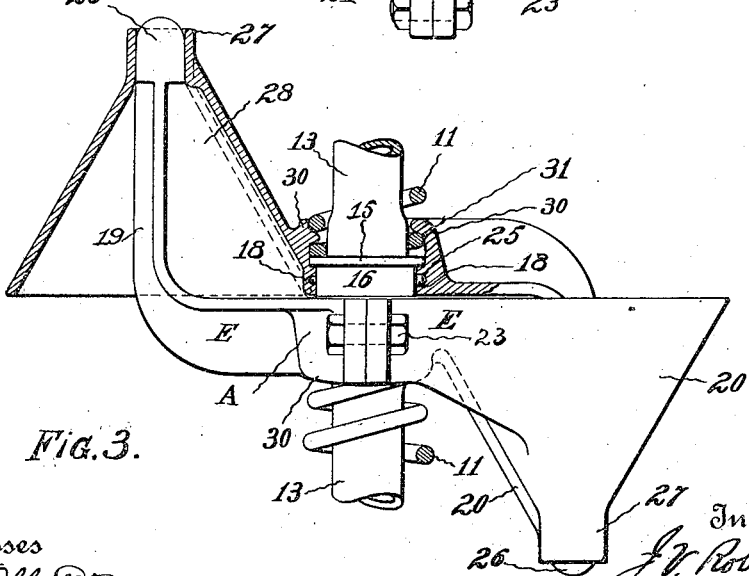
Witnesses
Inventor J. V. Robinson
By Attorney

UNITED STATES PATENT OFFICE.

JOSEPH V. ROBINSON, OF CHEVY CHASE, MARYLAND.

AUTOMATIC TRAIN-PIPE CONNECTOR.

1,245,791. Specification of Letters Patent. Patented Nov. 6, 1917.

Original application filed July 25, 1913, Serial No. 781,194. Divided and this application filed March 14, 1914. Serial No. 824,835.

*To all whom it may concern:*

Be it known that I, JOSEPH V. ROBINSON, a citizen of the United States, and a resident of Chevy Chase, county of Montgomery, State of Maryland, have invented certain new and useful Improvements in Automatic Train-Pipe Connectors, of which the following is a specification.

This is a division of my application Serial Number 781,194, filed July 25, 1913, for improvements in automatic train pipe connectors, and the invention hereinafter described has for its objects to provide an improved connector head comprising halves and having guiding members equipped with interlocking portions for preventing localization thereon of the strains of service; to provide on each half of the head a novel clamp for securely tying the end of the buffer spring to the coupling head, and to provide means for preventing incorrect assembly of the head upon its support.

The invention consists in the improvements, combinations and constructions hereinafter described, pointed out in the appended claims, and illustrated in the accompanying drawings, in which:

Figure 1, is a side elevation of my improved connector.

Fig. 2, is an end view thereof, and

Fig. 3, is a horizontal sectional view of two of the connector heads coupled.

Referring to the drawings: My improved connector head A is shown mounted on a yieldable support B comprising a two-piece base C bolted together and to the car by bolts 10, and comprising also a spring 11 interposed between the connector head and base. The spring is conical in outline, coiled of a gradually tapering bar and is locked in a recess 12 of the base by the aforesaid bolts. A fluid conduit 13 lies within the spring, extends axially thereof through an opening in the base C, and receives the hose of the car at 14. The forward end of the conduit is provided with a shoulder or annular seat 15 for the spring 11 and with a head 16 carrying a suitable gasket 17, and carrying also lugs 18 of varying size for insuring correct positioning of the coupling head A upon the said portion 16 of the conduit.

To accurately aline the gaskets 17 of mating heads, I provide the coupling head A with pin and funnel gathering means, 19 indicating the pin and 20 the funnel. The head comprises halves E—E bolted together about the head 16 of the conduit by bolts 23, which extend through perforated ears or lugs 24, on each of the said halves of the head. Apertures 25 of the head receive the lugs 18 of the conduit, insuring proper assembly of the halves thereon and preventing possible relative rotation of the head and conduit.

The pin 19 terminates in a cylindrical portion 26 for fitting closely within a corresponding portion 27 of the funnel 20. To prevent localization of the strains of service in these portions of the guiding members, I provide the pin with an axially extending rib or boss 28, which fits closely within a complementary recess or groove 29 in the funnel 20, as shown particularly in Fig. 3. In this manner the twisting and distorting strains occurring upon curves and under other conditions of disalinement of the heads A, are distributed throughout the full length of the pin and funnel.

To tie the buffer spring 11 to the coupling head A, I provide each of the halves E—E of the head with a portion 30 having a semicircumferential recess or groove 31 for receiving the coils of the apex end of the spring 11, about which end the halves of the head are securely clamped by the bolts 23 with the said spring coil seated in said recess.

When thus clamped in position the apex coils of the spring rest upon the annular seat 15 of the conduit and hold the head against undue axial and rotary movement independent of movement of the spring, and in like manner the spring is locked against such movement in the base C when the halves thereof are clamped together by the bolts 10 in assembling.

From the foregoing description, the operation of my automatic connector will be plain and it will be obvious that any desired type of connector head may be provided with my improved means for locking to it the supporting spring 11 and for securing the halves of the head together. I do not therefore desire to be limited to the exact construction shown and described.

Having thus described my said invention, what I claim as new and desire to secure by United States Letters Patent is:

1. In an automatic train pipe connector, the combination with a support, and a coupling head carried by the support and provided with pin and funnel gathering means, of means on the pin and funnel for preventing unequal localization thereon of the strains of service.

2. In an automatic train pipe connector, the combination with a coupling head having pin and funnel gathering means, of a boss on the pin for mating with a recess in the funnel to prevent localization of strains in the pin in service.

3. In an automatic train pipe connector, the combination of a coupling head having a funnel provided at its base with an opening, a pin on the head having a portion adapted to fit within said opening, and a boss at the base of said pin for engaging a recess adjacent the mouth of said funnel to prevent localization of strains in the funnel at said circular opening.

4. In an automatic train pipe connector, the combination of a pair of mating connector heads, provided with guide members of the pin and funnel type, one of said guide members having a recess extending longitudinally thereof, and a projection on the opposite coöperating member fitting the said recess when the heads are coupled thereby preventing local strains in the pin and funnel connection, substantially as described.

5. In an automatic train pipe connector, the combination of a pair of mating connector heads having coöperating members to guide the ports in said heads into register, one of said guide members having a groove therein, and a rib on the opposing guide member fitting the groove and adapted to pass into the same upon the connection of the heads, substantially as described.

6. In an automatic train pipe connector, a connector head comprising independent parts, providing a pin and a funnel, one of said parts having a longitudinally extending groove and the other part having a rib corresponding to said groove.

7. In an automatic train pipe coupling, the combination of a coupling head comprising halves, a support for the head, and means for securing said halves together about said support.

8. In an automatic train pipe connector, the combination of a sectional coupling head, a support adapted to be attached to a car, a member extending from said support, and means for securing the sections of the coupling head together about said member.

9. In an automatic train pipe connector, the combination of a coupling head, a member separate from the head and extending therefrom for yieldingly supporting the head, and means carried by said member for insuring the correct positioning of said head thereon in assembling.

10. In an automatic train pipe connector, the combination of a two-piece coupling head, a member extending through said head for yieldingly sustaining it, and means for preventing incorrect assembling of said pieces on said member.

11. In an automatic train pipe connector, the combination of a support, a connector head carried thereby and comprising independent members, one of the members having a semi-circumferential recess for receiving said support, and means for securing together the parts of said head with said support seated in said recess.

12. In an automatic train pipe connector, the combination of a support, a coupling head comprising two independent members each provided with a recess for receiving said support, and means for securing together the parts of said head with said support seated in said recess.

13. In an automatic train pipe connector, the combination of a spring, a connector head provided with recessed portions adapted to embrace said spring, and means for securing together said portions with said spring mounted in said recess.

14. In an automatic train pipe connector, the combination of a conduit, a spring surrounding the conduit, a connector head, and means for securing the connector head to said conduit and said spring.

15. In an automatic train pipe connector, the combination of a connector head, a fluid conduit extending through the head and having a shoulder abutting the head, a spring surrounding the conduit and abutting said shoulder, and means for securing the head to the conduit and the spring to the head with the spring pressing against said shoulder.

In testimony whereof, I have hereunto set my hand in the presence of two witnesses.

JOSEPH V. ROBINSON.

In the presence of—
ARTHUR L. BRYANT,
S. C. MCBRIDE.